United States Patent
Lenk et al.

(10) Patent No.: US 9,982,569 B2
(45) Date of Patent: May 29, 2018

(54) METHOD FOR OPERATING A STEAM TURBINE PLANT

(71) Applicant: Siemens Aktiengesellschaft, Munich (DE)

(72) Inventors: Uwe Lenk, Zwickau (DE); Alexander Tremel, Mohrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 15/023,029

(22) PCT Filed: Sep. 10, 2014

(86) PCT No.: PCT/EP2014/069257
§ 371 (c)(1),
(2) Date: Mar. 18, 2016

(87) PCT Pub. No.: WO2015/043949
PCT Pub. Date: Apr. 2, 2015

(65) Prior Publication Data
US 2016/0222832 A1    Aug. 4, 2016

(30) Foreign Application Priority Data
Sep. 24, 2013   (DE) .................. 10 2013 219 189

(51) Int. Cl.
*F01K 13/02*     (2006.01)
*F01K 23/18*     (2006.01)
(Continued)

(52) U.S. Cl.
CPC .............. *F01K 13/02* (2013.01); *F01K 3/004* (2013.01); *F01K 3/008* (2013.01); *F01K 3/02* (2013.01);
(Continued)

(58) Field of Classification Search
CPC . F01K 13/02; F01K 23/18; F01K 7/16; F01K 3/02; F01K 3/008; F01K 3/004; F01K 7/22; F01K 23/101; Y02E 20/16
(Continued)

(56) References Cited

U.S. PATENT DOCUMENTS 1,925,078 A    8/1933  Ruths
2,167,469 A *  7/1939  Wallin ................ F01K 3/008
                                                       290/2
(Continued)

FOREIGN PATENT DOCUMENTS

DE        1048596 B     1/1959
DE        1206443 B    12/1965
(Continued)

*Primary Examiner* — Hoang Nguyen
(74) *Attorney, Agent, or Firm* — Beusse Wolter Sanks & Maire

(57) ABSTRACT

A method for operating a steam turbine plant including a steam turbine and a steam generator allows a power reserve to be provided whilst simultaneously maintaining a high level of efficiency in the normal mode of operation. The steam turbine plant includes a heat reservoir which is associated with the steam turbine, from which the steam is removed and is fed to the steam turbine. The steam is fed to the steam turbine when the steam generator is not in operation.

9 Claims, 6 Drawing Sheets

(51) Int. Cl.
    *F01K 7/16* (2006.01)
    *F01K 3/00* (2006.01)
    *F01K 7/22* (2006.01)
    *F01K 23/10* (2006.01)
    *F01K 3/02* (2006.01)

(52) U.S. Cl.
    CPC ............... *F01K 7/16* (2013.01); *F01K 7/22* (2013.01); *F01K 23/101* (2013.01); *F01K 23/18* (2013.01); *Y02E 20/16* (2013.01)

(58) Field of Classification Search
    USPC ............... 60/652, 653, 677–679, 659, 664
    See application file for complete search history.

(56) References Cited

U.S. PATENT DOCUMENTS

| | | | |
|---|---|---|---|
| 2,193,863 A * | 3/1940 | Egloff | B60K 3/00 60/652 |
| 2,247,595 A | 7/1941 | Besler | |
| 2,418,477 A * | 4/1947 | Ostermann | F01K 3/04 122/35 |
| 2,467,092 A * | 4/1949 | Ostermann | F01K 3/10 60/659 |
| 3,129,564 A | 4/1964 | Brunner | |
| 3,398,534 A | 8/1968 | Hucks, Jr. | |
| 4,164,848 A | 8/1979 | Gilli et al. | |
| 5,148,668 A | 9/1992 | Frutschi | |
| 2009/0313997 A1* | 12/2009 | Bayley | F01K 3/00 60/659 |
| 2012/0291418 A1 | 11/2012 | Rusche | |
| 2014/0090378 A1 | 4/2014 | El Andreas | |
| 2015/0027122 A1 | 1/2015 | Brunhuber et al. | |
| 2015/0252726 A1 | 9/2015 | Eyer et al. | |

FOREIGN PATENT DOCUMENTS

| | | |
|---|---|---|
| DE | 1273714 B | 7/1968 |
| DE | 10260993 A1 | 7/2004 |
| DE | 102011100517 A1 | 11/2012 |
| DE | 102012204081 A1 | 9/2013 |
| EP | 0439754 A1 | 7/1995 |
| EP | 0976914 A1 | 2/2000 |
| EP | 2525052 A2 | 11/2012 |
| JP | S6069220 A | 4/1985 |
| WO | 2014044425 A1 | 3/2014 |

* cited by examiner

METHOD FOR OPERATING A STEAM TURBINE PLANT

CROSS REFERENCE TO RELATED APPLICATIONS

This application is the US National Stage of International Application No. PCT/EP2014/069257 filed Sep. 10, 2014, and claims the benefit thereof. The International Application claims the benefit of German Application No. DE 102013219189.8 filed Sep. 24, 2013. All of the applications are incorporated by reference herein in their entirety.

FIELD OF INVENTION

The invention relates to a method for operating a steam turbine plant with a steam turbine and a steam generator.

BACKGROUND OF INVENTION

Steam turbine plants of the type mentioned at the beginning are known from the prior art and are used to generate electricity in an electricity grid. Control power is held in readiness in order to maintain the grid frequency in the event of unforeseen disruptions. Every grid operator needs to make available 2% of its temporary generation capacity as a primary control power reserve. This primary control power reserve is typically provided by large power stations with capacities of more than 100 MW. This includes both steam turbine plants and combined gas-and-steam turbine plants.

In order to provide the control power quickly (in under 30 seconds), steam turbine power stations are throttled slightly in normal operation, i.e. steam turbine control valves are incorporated upstream from the steam turbine. When control power then needs to be provided, the throttle valve is opened completely and a power reserve is made available. This primary control power is then maintained for up to 15 minutes.

However, because the maximum efficiency of the steam turbine is achieved only at full power, the power stations are, as a result of the throttling required to provide the power reserve, operated during standard operation with a slightly inferior efficiency in comparison with their maximum possible efficiency.

It is therefore a technical requirement to provide a method for operating a steam turbine plant which enables a power reserve to be provided at the same time as the greatest possible efficiency during standard operation.

DE048596 provides a solution to this, in which it is described that steam is removed from a steam accumulator when there is a sudden increase in load and to quickly increase power, so that it can be fed to a steam turbine which is already in operation. Comparable solutions are known from U.S. Pat. Nos. 2,247,595 A, 1,925,078 A or 3,398,534 A. A corresponding application when a steam turbine is started up is moreover known from EP 0439754 A1, in which steam is removed from a steam store in order to support the steam time with a simultaneously operating waste heat steam generator However, the prior art is not able to account for the fact that the power output of a steam turbine plant is affected during the loading of the steam store as a result of this loading process. As a result of diverting steam for the steam store, less steam is namely available for the power mode of the steam turbine.

SUMMARY OF INVENTION

However, because a steam turbine plant is operated primarily according to the existing power demand, an object of the invention is thus to propose a steam turbine plant with a steam store which enables improved operation in terms of operating costs. In particular, it is intended for the loading process of the steam store to take place in an energy- and cost-efficient manner.

This object is achieved according to the invention by the steam turbine plant comprising a heat store associated with the steam turbine, from which steam is removed and fed to the steam turbine, wherein the steam is fed to the steam turbine whilst the steam generator is idle, wherein the heat store is loaded whilst a power demand on the steam turbine plant from a power grid is below a preset threshold value.

The invention here, in a similar fashion to the prior art, starts from the concept that, in order to improve the efficiency and flexibility of the steam turbine plant, the steam turbine is supplied with steam from a heat store. Heat stores in which heat can be stored and provided for future needs are suitable for this purpose. It can then be removed from the store, for example in the form of hot steam, and converted into mechanical power in the steam turbine. A heat store can, however, for example also be designed as a sensible heat store or alternatively as a PCM heat store which can emit its heat in order to evaporate water so that the steam thus formed is subsequently fed to the steam turbine.

According to the invention, the steam is fed to the steam turbine whilst the steam generator is idle. It is hereby possible, where the heat store is sufficiently large, to maintain the operation of the steam turbine using steam from the store without and/or with the provision of power. The heat store is therefore used to preserve the connection of the steam turbine to the grid even when no heat is provided in the steam generator (for example, when a gas turbine in a gas-and-steam power station is switched off). For this purpose, a small amount of steam from the store is supplied to the steam turbine in order to preserve the connection of the rotating mass to the grid. The amount of steam is here chosen such that losses from friction and other causes in the steam turbine are compensated for by the supply of steam.

In parallel or also alternatively, the steam generator can advantageously also be kept warm. This is achieved by the continuous feeding of a small amount of steam to the steam generator. The amount of steam is chosen such that the heat energy of the steam compensates for the heat losses from the steam generator. The steam generator thus remains at a relatively high temperature and can quickly be returned to operation at full load, for example when the gas turbine is started up in a gas-and-steam power station. This operating concept offers the option of keeping the steam turbine, and possibly the steam generator, warm so that the time required to start up the power station is shorter and the plant can be used for control purposes (for example, to balance power fluctuations in the grid).

The heat store can in principle be loaded in many ways. For example, the store can be heated electrically (using electric heaters or heat pumps), by means of which excess electricity from fluctuating energy sources (wind, sun) could also be taken from the grid. However, a particularly advantageous solution results when the store is loaded with hot water or steam from the power station itself. In a first advantageous embodiment of the method with respect to loading, the heat store is loaded with saturated water from a steam drum of the steam generator.

According to the invention, the heat store is loaded whilst a power demand on the steam turbine plant from a power grid is below a preset threshold value. The loading thus takes place at a period of low power demand in the grid. As a result of the loading process, the output of the steam turbine, and hence of the power station, namely falls slightly for a short period of time. Once the store is loaded, the power station continues to be operated in grid-driven power mode.

In a first advantageous embodiment of the method, with respect to loading, the heat store is loaded with saturated water from a steam drum of the steam generator. Alternatively or additionally, the heat store is advantageously loaded with saturated steam from a steam drum of the steam generator. For this purpose, an initial amount of cold water is situated in the heat store and the heat is stored in the form of steam. Saturated steam is removed from the steam drum of the steam generator at an appropriate pressure level and fed directly to the heat stores. Condensation takes place in the heat store, as well as an associated increase in pressure and temperature. The store is loaded when the temperature level or pressure level in the store reaches the level of the loaded steam.

In a further advantageous embodiment of the method, the heat store is loaded with superheated steam from the steam generator or the steam turbine. The steam has a higher energy level and thus permits quicker loading of the heat store. For this purpose, superheated steam is removed, for example, downstream from the high-pressure steam turbine and after reheating and fed to the heat store.

If superheated steam at a high pressure level is used (for example, live steam), the superheated steam can be conducted directly into the store. However, if the pressure level of the superheated steam is below the required heat store pressure, indirect heat transfer is indicated. For this, the heat store is advantageously loaded via a heat exchanger.

High-pressure steam can be used to load the heat store. The steam turbine plant thus advantageously comprises a high-pressure part, a medium-pressure part, and a low-pressure part, wherein the heat store is advantageously loaded from the high-pressure part of the steam generator. The steam is here advantageously fed to the medium-pressure part of the steam turbine. As a result, a particularly high energy content results in the heat store, so that the latter can be smaller in design or, with the same design, can deliver a longer or greater power boost for the steam turbine. However, the heat store thus needs to be designed for particularly high steam pressures.

If this is not desired, the heat store should then therefore be designed only for lower pressures and the heat store advantageously loaded from the medium-pressure part of the steam generator. The steam is then advantageously fed to the low-pressure part of the steam turbine. As a result, although the same energy density cannot be achieved in the heat store, the latter can have a technically simpler design because lower pressures prevail.

The steam turbine plant with a steam turbine and a steam generator advantageously comprises a heat store associated with the steam turbine, and means for performing the described method.

The heat store is here advantageously designed as a Ruths steam accumulator. This is essentially a pressure-tight drum store, the majority (for example, up to 90%) of which is filled with boiling water. The remaining space above the water is filled with water vapor at the same temperature. If steam is removed, re-evaporation begins. The heat required comes from the boiling water. The working range of the steam accumulator is here defined by the initial and final parameters (pressure and temperature) and the initial level to which it is filled with boiling water.

A gas-and-steam turbine plant advantageously comprises a described steam turbine plant. It comprises a gas turbine, the exhaust gases of which are used to operate the steam generator.

The advantages obtained with the invention consist in particular in the ability of the steam turbine part of a power station to be kept warm for a longer period of time, so that control power can be provided even without any fuel being consumed.

Adding only small quantities of additional steam as saturated steam from the store is hereby required. As a result, a slight drop in temperature occurs at the inlet of the steam turbine. However, the steam turbine is furthermore operated with superheated steam and the tendency for condensation inside the turbines is less.

The invention described can be implemented using available, cost-effective, passive components (drum store, hot-water and steam pipes). The operating range of the power station, for example a reduction in output from the removal of heat (hot water/steam) from the steam generator or an increase in output from the supply of additional steam to the steam turbine (from the store), is thus expanded in a technically simple fashion.

The integration of a heat store furthermore offers the possibility of storing energy in order to keep the water/steam circuit (steam generator) or the steam turbine warm. It is furthermore possible to stabilize the grid by coupling the steam turbine as a rotating mass in the grid with the supply of steam from the store (for example, possibility of operating a phase shifter with the steam turbine set). The concept can also be retrofitted.

BRIEF DESCRIPTION OF THE DRAWINGS

The invention is explained in detail with the aid of the drawings, in which.

DETAILED DESCRIPTION OF INVENTION

Figure 1:
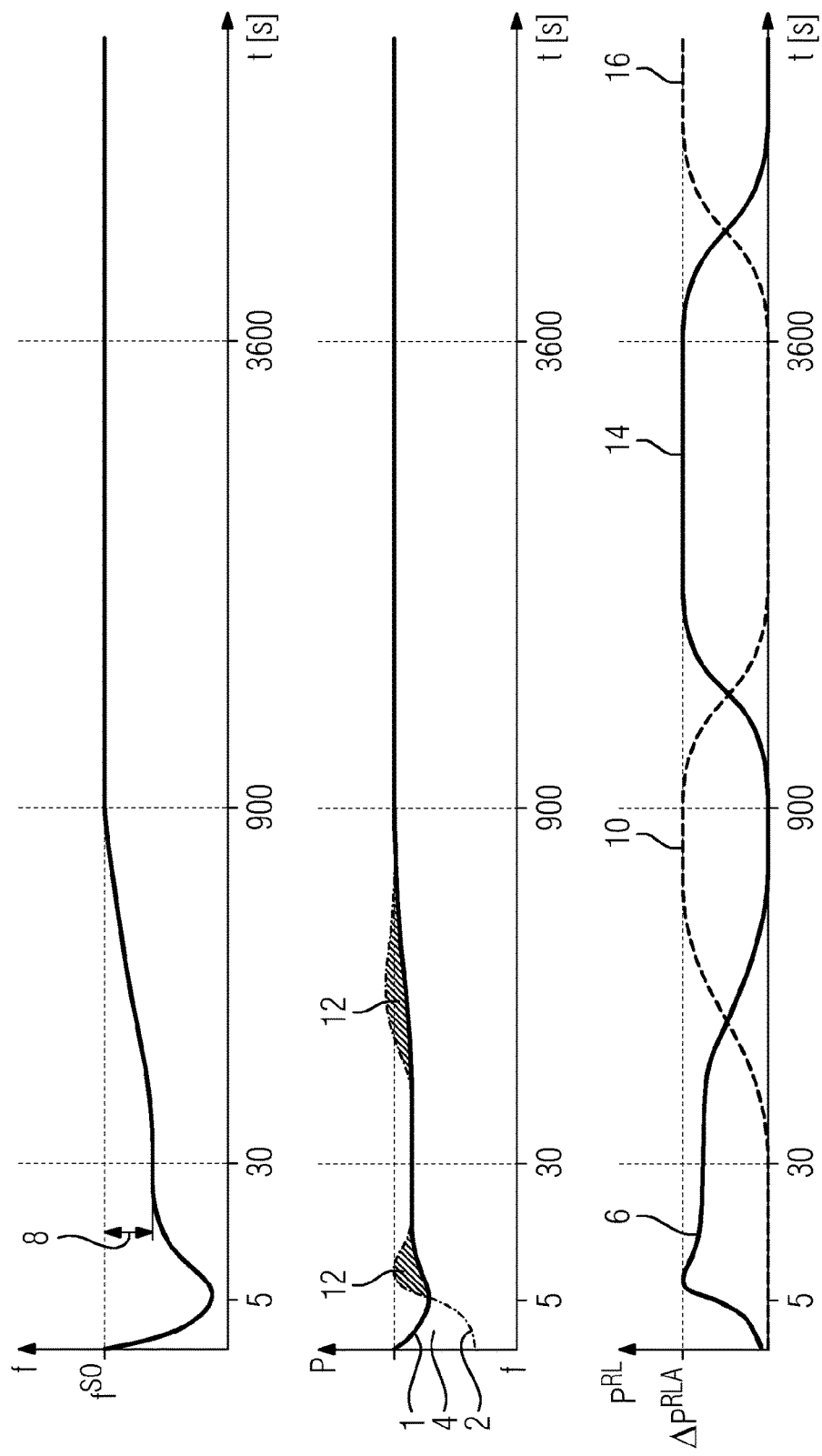
FIG. 1 shows a graph of the grid frequency, the power and the control power in an electricity grid, plotted against time.

Identical parts are provided with the same reference numerals in all the drawings.

FIG. 1 shows a graph with a total of three separate systems of coordinates, arranged one above the other. These show, from top to bottom, the grid frequency f in an electricity grid, plotted against time, level of consumption and generator power P in the electricity grid, plotted against time, and the different types of control power PRL in the electricity grid, plotted against time. The time scales are identical and are given in seconds, whilst the frequency f, power P and control power PRL scales are not given because the absolute scales are not relevant for the following description.

Attempts are made in an electricity grid, using a power station management approach, to balance power obtained in power stations with power removed by consumers and losses during transportation. If the expected power requirement does not correspond to the power supply, the discrepancy must be compensated for. This follows from the physical necessity that electricity power grids cannot store energy and that therefore at any point in time the fed-in power must correspond to the sum of the removed power and the power lost as a result of transportation. In alternating current grids, deviations result in a change in the grid frequency f which is uniform (synchronous) across the whole alternating current grid: when there is an excess supply of power, a deviation in the grid frequency f above the nominal frequency occurs, and when there is a shortage of supply a so-called underfrequency occurs. Control power PRL is required for compensation purposes when the actual temporary power demand does not correspond with the expected power supply.

The task of maintaining the frequency is divided into different control stages which can be understood in FIG. 1 by time information on the time axis: primary control serves to compensate disparities between the physical power supply and demand, with the aim of restoring a stable grid frequency. It is immaterial in which area of the electricity grid a fluctuation occurs because the temporary grid frequency alters in the whole grid as a result of load fluctuations. This is compared with the target frequency for the proportional primary controller of the power stations involved in the primary control, as shown in FIG. 1:

At the point in time 0 s, the level of consumption 1 is greater than the generator power 2. There is therefore a power deficit 4. As a result of this deviation, primary control power 6 is activated in every participating power station (usually all power stations with a nominal output greater than 100 MW) according to the controller characteristic and the grid frequency f is thus boosted.

It must be possible for the power stations involved in the primary control to provide, in the event of a quasi-stationary frequency deviation of ±200 mHz, the whole primary control power 6 within 30 seconds, i.e. to increase or reduce the power output linearly and to maintain this power for up to 15 minutes. The primary control power which is thus available, the so-called primary control range, must thus correspond to at least 2% of the nominal power of the plant.

FIG. 1 also shows the subsequent control stages, first the secondary control power 10 with a proportional and integral secondary controller. This has the task of restoring parity between the physical power supply and demand after the occurrence of a difference. The power excesses 12 shown in FIG. 1 as a result of the primary control power 6 at approximately 10 s and about 180 s are consequently compensated. The tertiary control or minute reserve 14 is moreover also shown in FIG. 1 and serves primarily for economic optimization. The minute reserve 14 is requested by telephone by the transmission grid operator to the supplier. It must be possible for the available minute reserve power to be produced completely within 15 minutes. Completely manual control power 16 also occurs.

The primary control power 6 and partly also the secondary control power 10 are considered below. As described, every grid operator within the electricity grid must be able to make 2% of its temporary generation available, within 30 seconds, for 15 minutes as a primary control reserve. In a power station 18 shown schematically in FIG. 2 with a steam turbine plant 20, in the prior art this means that the latter is throttled slightly so that a power reserve is available. This has a negative effect on the efficiency of the power station 18. The power station 18 in FIG. 2 can, however, also provide a power reserve without any throttling so that the efficiency in base load operation exceeds the efficiency in the prior art.

Figure 2:
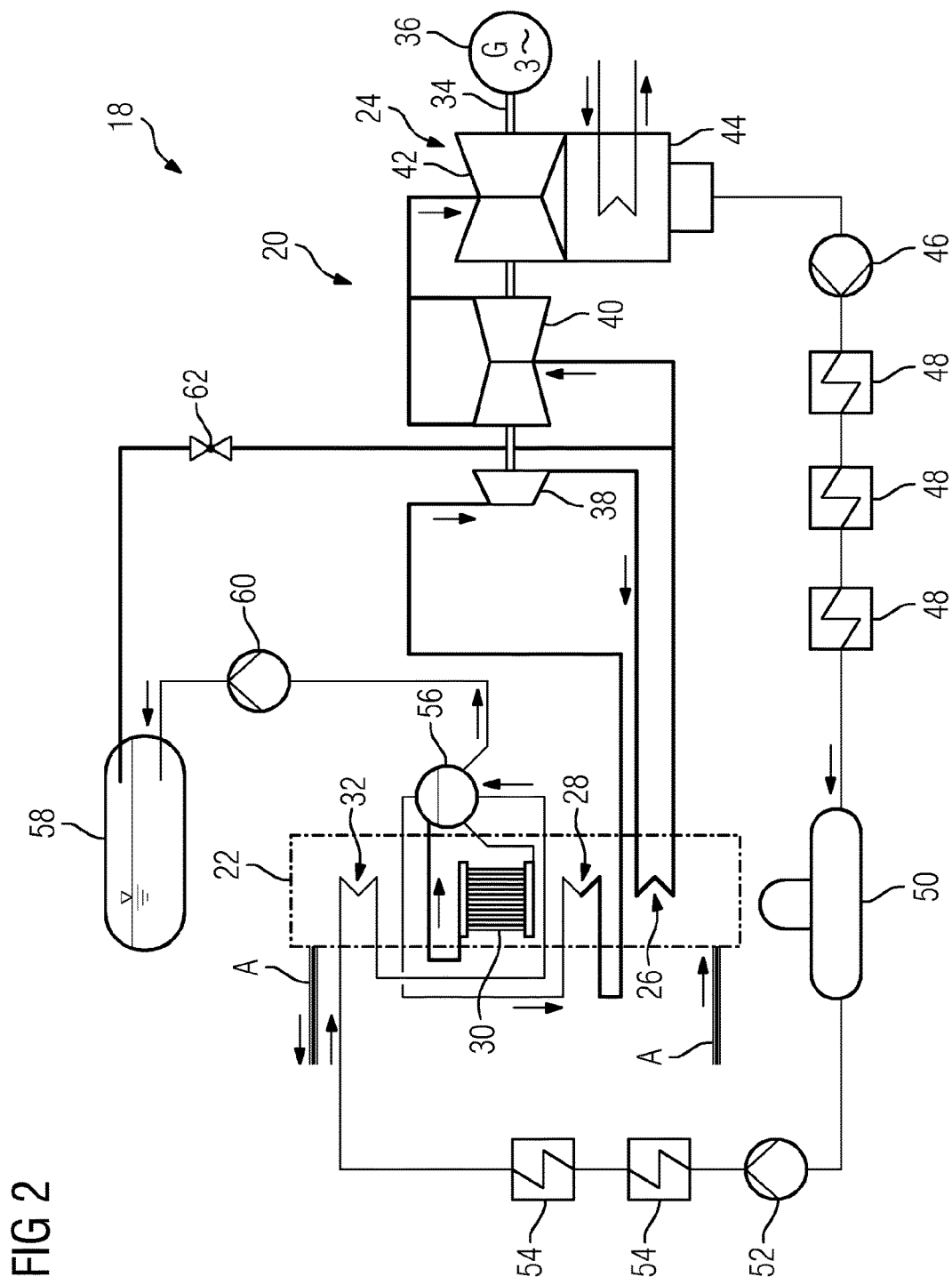
FIG. 2 shows a steam turbine plant with a heat store with fed-in saturated water.

The steam turbine plant 20 in FIG. 2 is part of a power station 18 designed as a gas-and-steam turbine power station. A gas-and-steam combined power station or gas-and-steam turbine power station is a power station 18 in which the principles of a gas turbine power station and a steam power station are combined. A gas turbine (not shown) here serves as a heat source for a downstream waste heat boiler 22 which in turn acts as a steam generator for the steam turbine 24. Using this combined operating mode, a greater efficiency is achieved in the thermodynamic cycle than with gas turbines in open operation or in conventionally fired steam power stations. Combined power stations with electrical efficiency of up to 60% are some of the most efficient conventional power stations in today's electricity grid. Nonetheless, the design described below can also be achieved in all other power stations 18 with a steam turbine plant 20.

As already explained, the waste gas from the gas turbine (not shown) is conducted into the waste gas boiler 22. The waste gas boiler 22 comprises, in the direction of the direction of flow of the waste gas A, in succession, a reheater 26, a superheater 28, an evaporator 30, and an economizer 32. The steam generated in the waste heat boiler 22 is collected and used to drive the steam turbine 24. The steam turbine 24 is arranged in the steam turbine plant 20 in FIG. 2 on a separate shaft 34 with a generator 36.

The steam turbine plant 20 is designed as a three-pressure plant, i.e. the steam turbine 24 has a high-pressure turbine 38, a medium-pressure turbine 40, and a low-pressure turbine 42. The design described below can, however, also be achieved with more complex structures. Each turbine 38, 40, 42 of the steam turbine 24 has stator blades and rotor blades (not shown in detail) alternating inside a housing in an axial direction. The stator blades are arranged so that they form a circle along the circumference of the shaft 34. Such a circle of stator blades is also referred to as a stator blade wheel. The rotor blades are likewise arranged in a circle, so that they can rotate, as a rotor blade wheel on the respective shaft 34. A stator blade wheel, together with the downstream adjacent rotor blade wheel, is referred to as a turbine stage.

The expanded steam from the steam turbine 24 is conducted into a condenser 44 and the liquefied medium is conducted by a condensate pump 46 via multiple low-pressure preheaters 48 into a feed water tank 50 with a degasser. From here the medium is fed by a feed pump 52 via multiple preheaters 54 to the waste heat boiler 22. Here it arrives first at the economizer 32 and enters a steam drum 56. In the waste heat boiler 22, the steam drum 56 forms a circuit with the evaporator 30 so that liquid, preheated medium is fed continuously to the evaporator 26. Evaporated medium thus leaves at the upper end of the steam drum 56 and enters the superheater 28 and is lastly fed to the high-pressure turbine 38.

The steam is expanded in the high-pressure turbine 38 and conducted at its outlet to the reheater 26, where it is superheated again in the waste gas flow. The steam is then conducted into the medium-pressure turbine 40, further expanded there, and conducted to the low-pressure turbine 42. After the expansion in the low-pressure turbine 42, the steam is conducted into the condenser 44.

The generator 36 of the steam turbine plant 20 can be connected in parallel to the generator (not shown) of the gas turbine, or alternatively the gas-and-steam power station is designed as a single-shaft plant so that the gas turbine is likewise connected to the shaft 34. In each case, the generator 36 is connected to the external electricity grid via a transformer.

A heat store 58 is associated with the steam turbine plant 20 in order to hold the 2% control reserve in readiness. The heat store 58 consists of multiple pressure drum stores which are designed as Ruths steam accumulators. Liquid medium is at high pressure in the Ruths steam accumulators. In the exemplary embodiment in FIG. 2, the heat store 58 is loaded with saturated water. The latter is removed from the steam drum 56 via a feed pump 60 and fed to the heat store 58. If the energy stored in the heat store 58 is to be called off, steam is removed from the heat store 58 and fed to the medium-pressure turbine 40 via a throttle valve 62, i.e. is mixed in the steam flow from the reheater 26.

Figure 3:
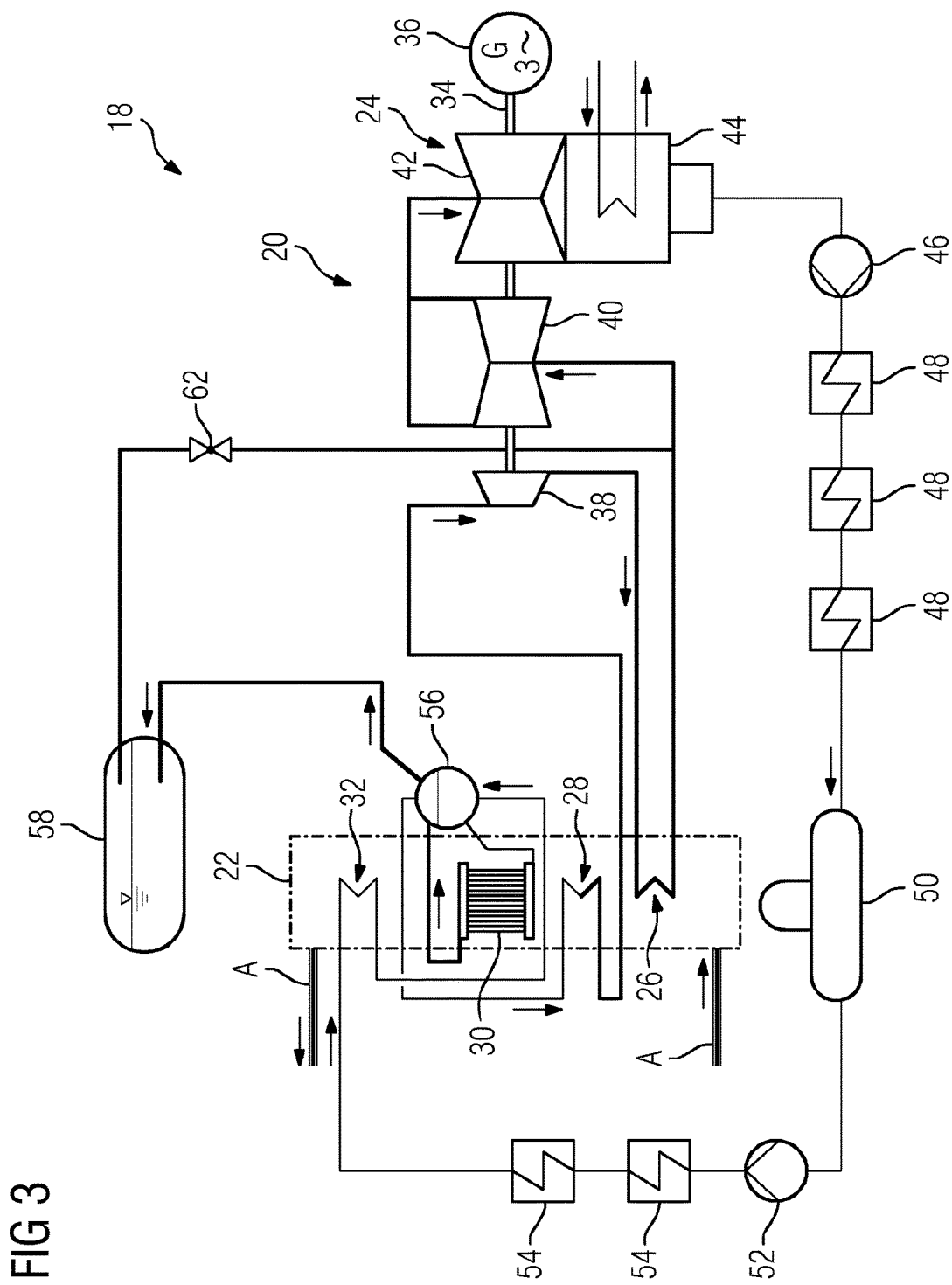
FIG. 3 shows schematically a steam turbine plant with a heat store with fed-in saturated steam.

Alternatively, an initial amount of cold water can also be situated in the pressure drum stores of the heat store 58 and heat is stored in the form of steam. This embodiment is shown in FIG. 3 and is described only in terms of its differences from FIG. 2. Saturated steam is hereby removed from the steam drum 56 and fed directly to the heat store 58. Condensation, and an associated increase in pressure and temperature, take place in the heat store 58.

Figure 4:
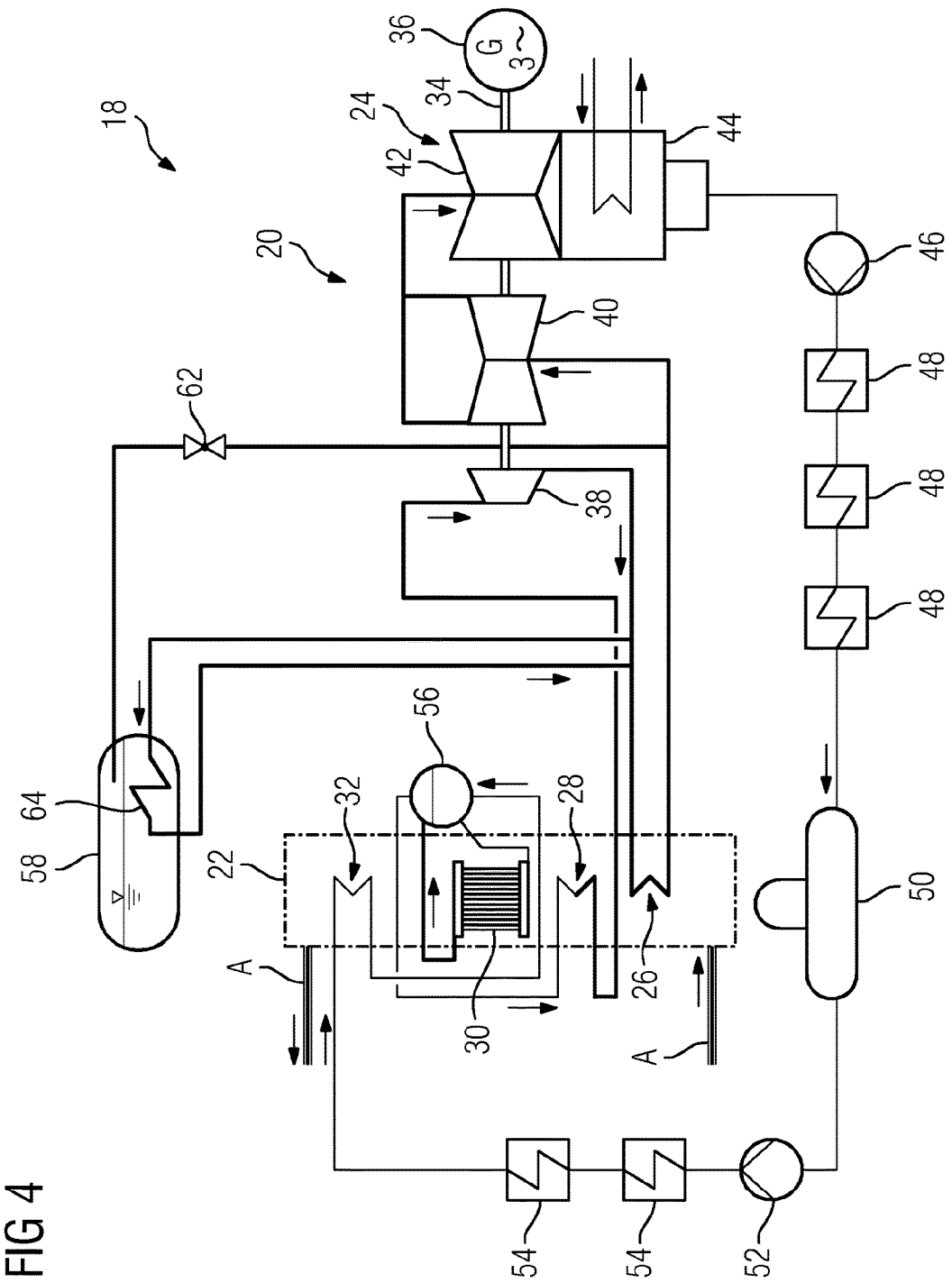
FIG. 4 shows schematically a steam turbine plant with a heat store with live steam fed in via a heat exchanger.

Loading with superheated steam is also possible. The corresponding embodiment is shown in FIG. 4, which again is explained only in terms of its differences from FIGS. 2 and 3. Superheated steam is here removed downstream from the high-pressure turbine 38 and reheater 26 and fed to the heat store 58. If the pressure level of the superheated steam is below the required drum store pressure, it is necessary to incorporate a heat exchanger 64 in the heat store 58, as shown in FIG. 4. The steam is then fed back from the heat exchanger between the high-pressure turbine 38 and the reheater 26.

If superheated steam at a high pressure level is used (for example, live steam direct from the superheater 28, not shown in the drawings), there is no need for indirect heat transfer and the superheated steam can be conducted directly into the heat store 58. Equally, during removal of heat from the store, it is also possible for steam to be fed into the low-pressure turbine 42 (likewise not shown).

The heat store 58 is loaded when the temperature or pressure level in the heat store 58 reaches the level of the loaded steam. Loading takes place at a period of low power demand in the grid. As a result of the loading process, the output of the steam turbine 24 and hence of the power station 18 falls slightly for a short period of time. If the heat store 58 is loaded, the power station 18 continues to operate in grid-driven power mode. There is now no longer a need to throttle the steam turbine 24 and the efficiency of the power station 18 is superior to the current operating design.

The heat store 58 makes the steam turbine plant 20 considerably more flexible. Moreover, the heat store 58 can also be loaded in different manners, for example be heated electrically or using heat pumps. Excess electricity from fluctuating energy sources (wind, sun) could thus be taken from the grid.

Different operating modes, explained below, are conceivable for removing heat from the store.

Firstly, the steam turbine 24 can be operated in principle only using steam from the heat store 58. The steam turbine 24 can be driven by steam from the heat store 58.

As a result, power can be provided in a very short period of time. However, a disadvantage of this design is that the steam turbine 24 needs to be driven and operated using saturated steam or only slightly superheated steam, which can give rise to technical risks (water droplets from condensation: the impact of droplets and erosion).

It is, however, possible to provide primary control power, as design calculations show. A gas-and-steam power station using a three-pressure reheating process based on a Siemens SGT5-4000F gas turbine is used for the calculations. It is assumed that hot water at the pressure level of the live steam (approximately 140 bar, 340° C.) is saved in the pressure drum stores of the heat store 58. It is furthermore assumed that thirty pressure drums with a volume of approximately 20 m$^3$ each are installed as a heat store 58.

Figure 5:
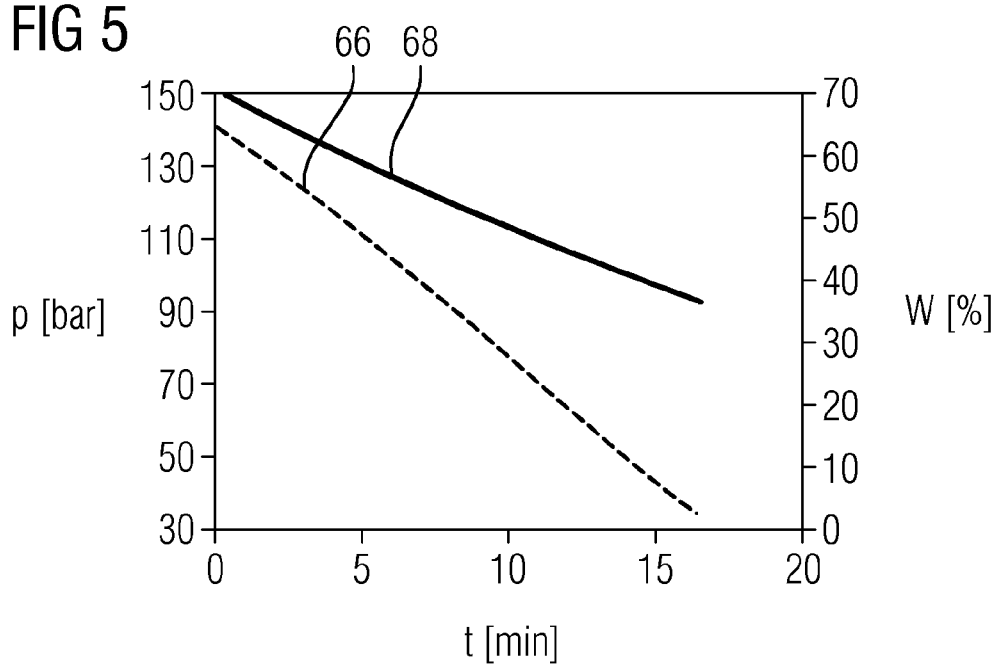
FIG. 5 shows a graph of water level and store pressure in the heat exchanger when steam is removed into the medium-pressure part of the steam turbine, plotted against time.

The medium-pressure turbine 40 has a normal steam mass flow of approximately 90 kg/s and is operated with reheated steam (approximately 30 bar, 560° C.). If only steam with 90 kg/s is now fed from the abovementioned pressure drums to the medium-pressure turbine 40 (approximately 35 bar, 242° C.), power of approximately 75 MW can be expected. The drop in pressure of the store pressure 66 in the heat store 58, and the fill level 68 of the store are shown in FIG. 5. The graph hereby shows, on the left-hand scale, the store pressure 66 in bar and, on the right-hand scale, the fill level in percent, plotted against time in minutes. If medium-pressure steam with a pressure of approximately 35 bar is removed, it can be expected that it takes approximately 15 min to remove the heat from the store. This is sufficient to provide primary control power.

Figure 6:
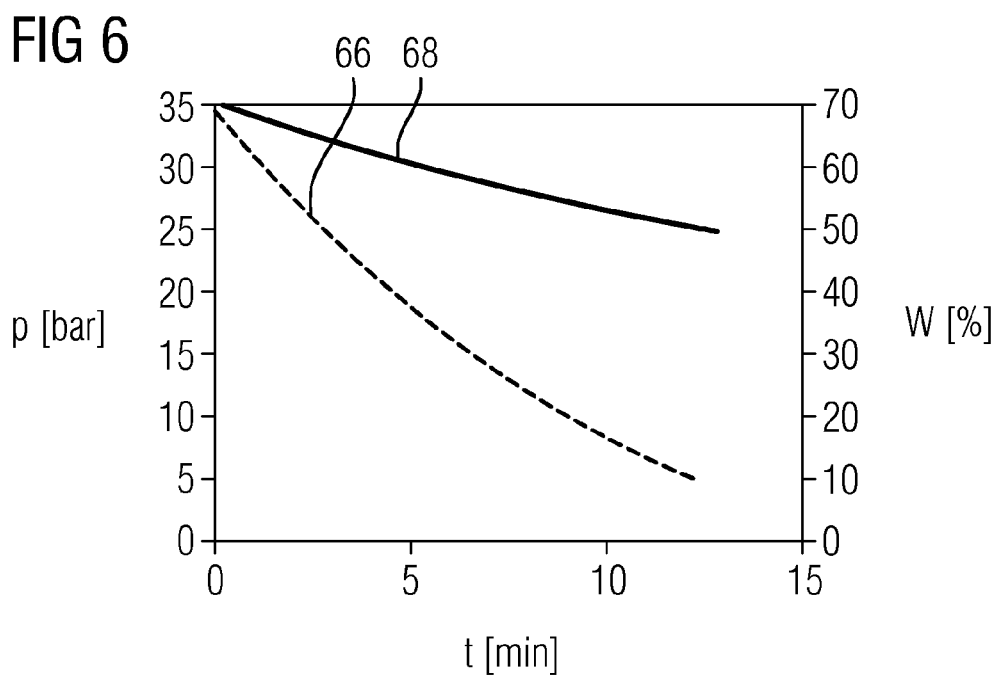
FIG. 6 shows a graph of water level and store pressure in the heat exchanger when steam is removed into the low-pressure part of the steam turbine, plotted against time.

Similarly, it is also possible to store hot water at a medium pressure level (approximately 35 bar, 242° C.) and remove it into the low-pressure turbine 42 (approximately 5 bar, 150° C.). The low-pressure turbine 42 has a normal steam mass flow of approximately 110 kg/s and is operated with steam slightly superheated by expansion (approximately 4 bar, 270° C.). The achievable control power is thus less as a result of the lower storage capacity of the heat store 58 at medium pressure level (lower temperature difference between the full and unloaded store). It has been shown that, when heat is removed at 110 kg/s, approximately 60 MW can be provided for 12 min, if 30 pressure drums are again used as the heat store 58. The store pressure 66 and fill level 68 of the heat store 58 in this case are shown in FIG. 6, in the same view as FIG. 5. Longer periods can be achieved by increasing the number of drums.

Because, as described above, the steam turbine 24 can be operated in a technically problematical fashion with saturated steam or only slightly superheated steam, it is conceivable as an operating design for the heat store 58 to be used in order to keep the steam turbine 24 connected to the grid even when no heat is provided in the steam generator 22 (for example, when the gas turbine in the gas-and-steam power station is switched off). The steam turbine 24 is therefore provided with a small amount of steam from the heat store 58 in order to maintain the rotating mass connected to the grid. The amount of steam is here chosen such that friction and other losses of the steam turbine 24 are compensated by the supply of steam.

In a design calculation, it is again assumed that 30 high-pressure drums, each with approximately 20 m$^3$, are available as a heat store 58. It is furthermore assumed that approximately 5% of the normal steam mass flow at a medium pressure level is sufficient as the saturated steam in order to compensate for the friction losses and maintain the steam turbine 24 connected to the grid. Based on these assumptions, the steam turbine 24 is then maintained connected to the grid for approximately 5 to 8 hours without any fuel being consumed in the power station 18.

In addition, the steam mass flow from the heat store can be increased for a short period of time, as a result of which primary control power can be provided. However, this results, depending on the steam consumed and the size of the store, in a shortened possible operating period. In parallel with the steam turbine 24, the waste heat boiler 22 can also be kept warm. This is achieved by continuously supplying a small amount of steam to the waste heat boiler 22 from the heat store 58. The amount of steam is chosen such that the heat energy of the steam compensates the heat losses from the waste heat boiler 22. The waste heat boiler 22 thus remains at a relatively high temperature and can be quickly restored to full-load mode, for example if the gas turbine is operated in a gas-and-steam turbine.

Lastly, it is also possible for steam to be added from the heat store 58 at full power mode of the steam turbine 24. The additional supply of steam from the heat store 58 is hereby used to provide extra power or primary and secondary control power for a short period of time. It is thus then possible to dispense with the throttling of the steam turbine 24 in normal operation because the primary control can be provided by the heat store 58. The efficiency of the power station 18 is thus higher in base load mode.

Only small amounts of extra steam are hereby added as saturated steam from the store. As a result, a slight decrease in temperature occurs at the inlet of the steam turbine 24. The steam turbine is, however, also operated with superheated steam and the tendency for condensation inside the turbines 38, 40, 42 is less.

Figure 7:
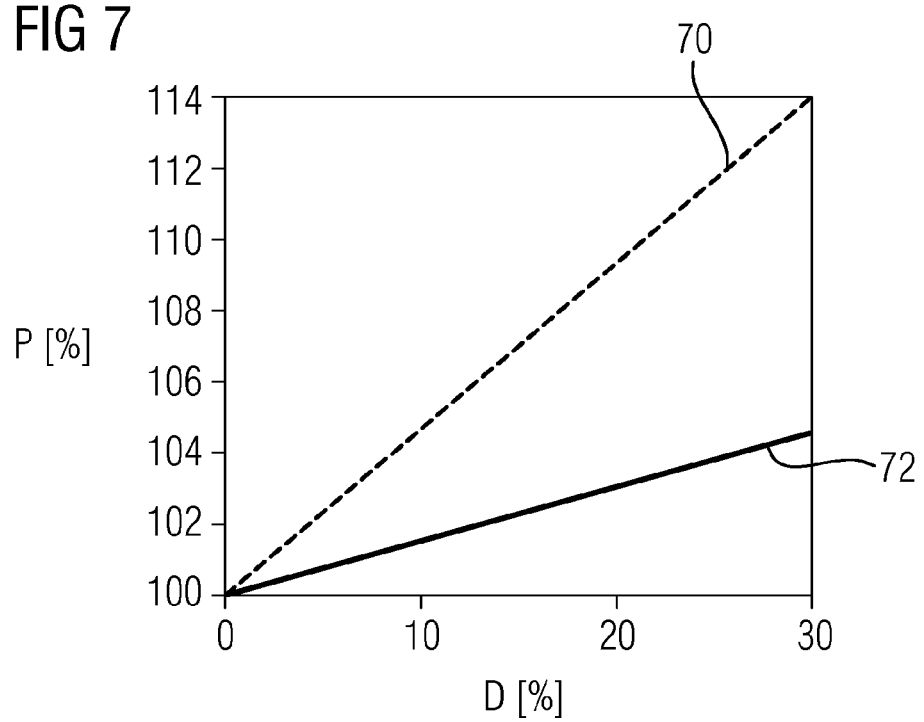
FIG. 7 shows a graph of the relative power of the steam turbine, plotted against the relative amount of steam added to the medium-pressure part.

The results of a design calculation for a gas-and-steam power station using a three-pressure reheating process are again shown. The effect of adding extra steam to the medium-pressure turbine 40 is shown in FIG. 7, which shows the relative power with regard to full load as a function of the relative addition of steam at medium pressure, both for the steam turbine power 70 and for the whole gas-and-steam power 72.

Figure 8:
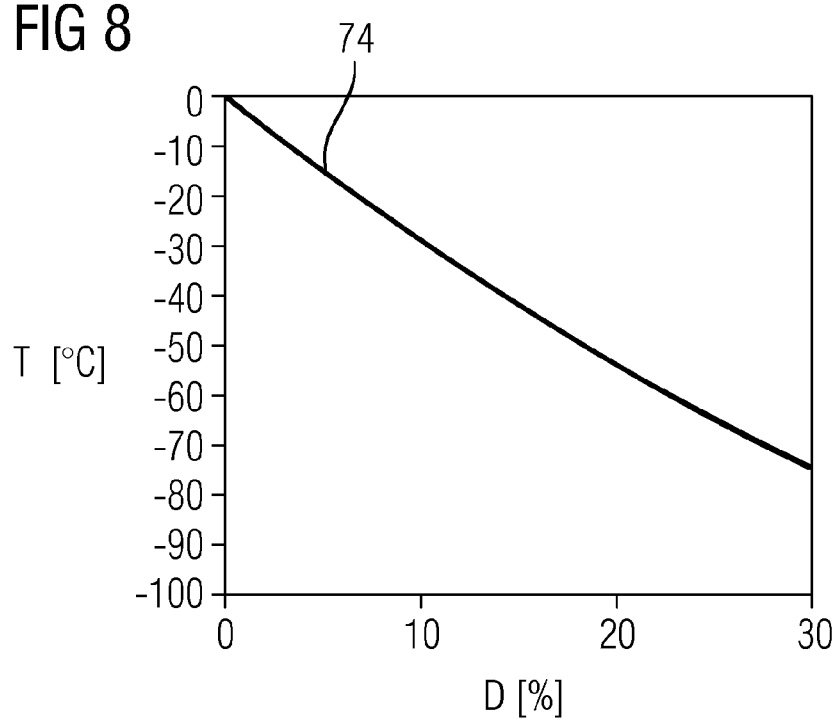
FIG. 8 shows a graph of the reduction in temperature at the inlet of the medium-pressure part of the steam turbine, plotted against the relative amount of steam added to the medium-pressure part.

Primary control power can also be provided with this design. As shown in FIG. 7, the gas-and-steam power is increased by approximately 2% when the amount of steam (medium pressure level) at the medium-pressure turbine 40 rises by approximately 12%. The effects on the steam turbine inlet temperature 74 are minor, as shown in FIG. 8. The reduction in the steam turbine inlet temperature 74 in ° C., plotted against the relative addition of steam at medium pressure level, is shown here. The temperature reduction is, for example, approximately 35 K, i.e. the steam turbine 24 is moreover operated with highly superheated steam.

The amounts of steam required are hereby small, which reduces the required storage volume. Only four high-pressure drums, each with a volume of approximately 20 $m^3$, are necessary as a heat store 58 to provide primary control power in the case of a gas-and-steam power station based on a Siemens SGT5-4000F gas turbine. These four drums allow a control energy reserve of 2% of the power station output to be provided for approximately 15 min. Installing a larger number of drums alone allows control energy in the region of a minute reserve to be provided.

Assuming medium-pressure drums are installed as a heat store 58 to provide steam for the low-pressure turbine 42 at 5 bar, the required steam mass flow increases because only the increase in output at the low-pressure turbine 42 is used. It is necessary to increase the steam mass flow to the low-pressure turbine 42 by approximately 17% for a similar two-percent increase in output of the power station 18. Six medium-pressure drums, each with 20 $m^3$, are required to maintain the increased output for approximately 15 min.

The invention claimed is:

1. A method for operating a steam turbine plant with a steam turbine and a steam generator, the steam turbine plant comprising a heat store associated with the steam turbine, the method comprising:
   removing steam from the heat store and feeding to the steam turbine,
   wherein the steam is fed to the steam turbine whilst the steam generator is idle, and
   loading the heat store with saturated water from a steam drum of the steam generator whilst a power demand on the steam turbine plant from a power grid is below a preset threshold value.

2. The method as claimed in claim 1,
   wherein the heat store is loaded with superheated steam from the steam generator or the steam turbine.

3. The method as claimed in claim 2,
   wherein the heat store is loaded via a heat exchanger.

4. The method as claimed in claim 1,
   wherein the steam turbine plant comprises a high-pressure part, a medium-pressure part, and a low-pressure part, and
   wherein the heat store is loaded from the high-pressure part of the steam generator, and the steam is fed to the medium-pressure part of the steam turbine.

5. The method as claimed in claim 1,
   wherein the steam turbine plant comprises a high-pressure part, a medium-pressure part, and a low-pressure part, and
   wherein the heat store is loaded from the medium-pressure part of the steam generator, and the steam is fed to the low-pressure part of the steam turbine.

6. A steam turbine plant comprising:
   a steam turbine,
   a steam generator,
   a heat store associated with the steam turbine from which steam is removed and fed to the steam turbine, wherein the heat store is adapted such that the steam is fed to the steam turbine whilst the steam generator is idle, and the heat store is loaded with saturated water from a steam drum of the steam generator whilst a power demand on the steam turbine plant from a power grid is below a preset threshold value.

7. The steam turbine plant as claimed in claim 6,
   wherein the heat store is designed as a Ruths steam accumulator.

8. A gas-and-steam turbine plant comprising:
   a steam turbine plant as claimed in claim 6.

9. The method as claimed in claim 1, further comprising feeding the steam from the heat store to the steam generator whilst the steam generator is idle.

* * * * *